United States Patent [19]

Blount

[11] 4,235,974
[45] Nov. 25, 1980

[54] PROCESS FOR THE PRODUCTION OF EPOXY CELLULAR SOLID PRODUCTS

[76] Inventor: David H. Blount, 5450 Lea St., San Diego, Calif. 92105

[21] Appl. No.: 107,044

[22] Filed: Dec. 26, 1979

Related U.S. Application Data

[63] Continuation-in-part of Ser. No. 4,039, Jan. 17, 1979, abandoned, which is a continuation of Ser. No. 821,584, Aug. 4, 1977, Pat. No. 4,087,407.

[51] Int. Cl.$^3$ .................................................. C08J 9/02
[52] U.S. Cl. .................................... 521/99; 521/84; 521/112; 521/123; 521/129; 521/132; 521/135; 521/136; 521/137; 521/139; 521/140; 521/178
[58] Field of Search ................................. 521/99, 178

[56] References Cited

U.S. PATENT DOCUMENTS

| | | | |
|---|---|---|---|
| 2,739,134 | 3/1956 | Parry et al. | 521/178 |
| 2,831,820 | 4/1958 | Aase et al. | 521/178 |
| 2,987,432 | 6/1961 | Oliva | 521/178 |
| 3,129,191 | 4/1964 | Nickerson et al. | 521/178 |
| 3,154,504 | 10/1964 | Carey et al. | 521/178 |
| 3,198,756 | 8/1965 | Richter et al. | 521/178 |
| 3,282,863 | 11/1966 | Carey et al. | 521/178 |
| 3,373,121 | 3/1968 | Burgert et al. | 521/178 |
| 3,420,794 | 1/1969 | May | 521/178 |
| 4,043,950 | 8/1977 | Wilmsen | 521/178 |
| 4,143,009 | 3/1979 | Dewey | 521/178 |

FOREIGN PATENT DOCUMENTS 881257 11/1961 United Kingdom ..................... 521/178

*Primary Examiner*—Morton Foelak

[57] ABSTRACT

Epoxy compounds will react chemically with an amine to produce an epoxy prepolymer that will produce a self-standing cellular solid product upon heating.

11 Claims, No Drawings

PROCESS FOR THE PRODUCTION OF EPOXY CELLULAR SOLID PRODUCTS

CROSS-REFERENCE TO RELATED APPLICATIONS

This application is a continuation-in-part of my earlier U.S. patent application No. 4,039, filed Jan. 17, 1979, now abandoned which is a continuation of my earlier U.S. patent application No. 821,584, filed Aug. 4, 1977 now U.S. Pat. No. 4,087,407.

BACKGROUND OF THE INVENTION

This invention related to the production of epoxy cellular solid products by reacting an epoxy compound with an organic polyamine compound to produce an epoxy prepolymer. The epoxy prepolymer expands when heated to produce an epoxy cellular solid, without the addition of a blowing agent. Various organic and inorganic compounds and polymers may be added to the prepolymer to give the desired physical properties.

The epoxy cellular solids may be produced as a rigid, semi-rigid, flexible or elastic cellular solid. The liquid epoxy prepolymer expands 3 to 12 times its original volume to produce the cellular solid. The epoxy cellular solids have a number of diverse applications. They may be molded into useful cellular solid products by pouring the prepolymer into a mold and heating it at 80° C. to 100°° C. The cellular solid may be used for insulation, floatation, strengthening material, packaging material and for its acoustic properties. The epoxy cellular solid may be produced as a soft cellular solid and is biodegradable.

Foamed epoxy resins have been produced by the use of a blowing agent as illustrated in U.S. Pat. Nos. 3,420,794; 2,831,820; 2,739,134; 2,987,482; 3,129,191; 3,154,504; 3,198,756; 3,282,863; 3,373,121; 4,043,504; and 4,143,009, but none of these U.S. Patents produce foamed epoxy resins without the use of blowing agents (foaming agents). The process of this invention is different from the listed U.S. Patents by the fact that no blowing agent needs to be added in order to produce the foamed cured epoxy resin. In the listed U.S. Patents such as U.S. Pat. No. 3,420,794, a special activator and a foaming agent (blowing agent) such as the chlorofluoralkanes known as "Freons", is necessary in order to produce the foam. In that U.S. Patent, a foaming agent (blowing agent) is mixed with the epoxy resin and curing agent, then the mixture is heated to expand the blowing agent, thereby producing the foamed cured epoxy resin. In the present invention, the epoxy resin is expanded to produce a foam by the release of a gas from the epoxy resin molecule when it is heated to above 80° C. The exact composition of the gas produced is not known, but appears to be a combination of carbon dioxide, nitrogen and oxygen.

SUMMARY OF THE INVENTION

I have discovered that a cellular solid product may be produced by reacting an epoxy compound with an organic polyamine. The proportions of the epoxy and the polyamine compound may be varied, for example, to produce a cellular solid ranging from a soft rubbery cellular solid to a soft cellular solid to a semirigid cellular solid and to a rigid cellular solid.

The reactants may be mixed in any suitable proportions, depending upon the product characteristics desired. Generally, from 1 to 3 parts by weight of a polyamine compound are mixed with 1 to 5 parts by weight of an epoxy compound, and about 1 to 3 parts by weight of an inorganic or organic compound may be added if desired.

The preferred process of this invention is to slowly add an epoxy compound to a compound containing 2 or more amine groups, while agitating at ambient pressure and keeping the temperature between ambient temperature and 70° C. until the prepolymer is produced. When it is desirable, the liquid epoxy prepolymer may be heated to 80° C. to 100° C. while agitating for a few minutes until the foaming process starts. The prepolymer expands 3 to 12 times its original volume to produce a free-standing cellular solid. To improve its physical properties, it may be heated at 100° C. to 150° C. for 1 to 2 hours. The cellular solid produced is usually thermosetting.

The reactions of this invention may take place under any suitable physical conditions. While many of the reactions will take place acceptably at ambient temperatures and pressure, in some cases, better results may be obtained at somewhat elevated temperatures and pressures. Perferably, the reaction takes place at a temperature between 20° C. and 100° C. On the other hand, where the reaction is exothermic, it may be desirable to cool the reaction vessel. With some products it is desirable to heat the cellular solid at 100° C. to 150° C. for 1 to 2 hours.

The exact course of the reactions which take place during the process to produce epoxy cellular solids cannot be determined with 100 percent certainty. The exact chemical formula for the epoxy cellular solid is not known.

Best results are obtained when the epoxidized unsaturated organic compounds, epoxidized polyhydroxy compounds, epoxidized fatty acids, phenoxy resins and epoxidized vegetable oils are used with epichlorohydrin in the production of epoxy cellular solids. The ratio of the parts by weight of epoxidized compounds to the parts by weight of epichlorohydrin may be quite varied, ranging from 2 to 1 up to 1 to 2. The epoxidized compounds or resins should have 2 or more reactive epoxy groups per molecule for the purpose of this invention.

Epoxy cellular solid products are produced by mixing the following components:

A: polyfunctional epoxide,
B: polyamine,
C: optionally, foam regulator.

Component A

Any suitable polyfunctional epoxide compound may be used in this invention. Suitable polyfunctional epoxide compounds include epihalohydrin such as epichlorohydrin, epibromohydrin, methyl epichlorohydrin and di-epi-iodohydrin and polyepoxides. The polyepoxides to be used by the new process of the invention comprise those materials possessing more than one, and preferably at least two, vicinal epoxy groups, i.e.,

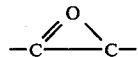

groups. These compounds may be saturated or unsaturated, aliphatic, cycloaliphatic, aromatic or heterocyclic, and may be substituted, such as chlorine, hydroxyl groups, ether radicals and the like. They may be monomeric or polymeric. The most common or conventional epoxy resins are obtained by reacting epichlorohydrin with a polyhydroxyl compound, such as Bisphenol A, in the presence of a catalyst.

For clarity, many of the polyepoxides and particularly those of the polymeric type are described in terms of epoxy equivalent values. The meaning of this expression is described in U.S. Pat. No. 2,633,458. The polyepoxides used in the present process are those having an epoxy equivalency greater than 1.0. Various examples of polyepoxides that may be used in the process of this invention are given in U.S. Pat. No. 2,633,458 and it is to be understood that so much of the disclosure of that patent relative to examples of polyepoxides is incorporated by reference into this specification.

Other examples include the epoxided esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyhexyl) succinate, di(3,4-epoxybutyl) maleate, di(2,3-epoxyoctyl) pimetate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl)1,2,4-butanetricarboxylate, di(5,6-epoxypentadecyl) tartarate, di(4,5-epoxytetradecyl) maleate, di(2,3-epoxybutyl) acelate, di(3,4-epoxybutyl) citrate, di(5,6-epoxyoctyl) cyclohexane-1,2-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-3,4-epoxypentanoate; 3,4-epoxyhexyl 3,4-epoxyoctanoate; 3,4-epoxycyclohexyl 3,4-epoxycyclohexanoate; 3,4-epoxycyclohexyl 4,5-epoxyoctanoate; 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate;
dibutyl 7,8,11,12-diepoxyoctadecanedioate;
dioctyl 10,11-diethyl-8,9,12,13-diepoxyiconsanedioate;
dihexyl 6,7,10,11-diepoxyhexadecanedioate;
didecyl 9-epoxy-ethyl-10,11-epoxyoctadecanedioate;
dibutyl 3-butyl-3,4,5,6-diepoxycyclohexane-1,2-dicarboxylate;
dicyclohexyl 3,4,5,6-diepoxycyclohexane-1,2-dicarboxylate;
dibenzyl 1,2,4,5-diepoxycyclohexane-1,2-dicarboxylate; and 5,6,10,11-diepoxyoctadecyl succinate.

Still another group comprises the epoxidized polyesters obtained by reacting an unsaturated polyhydric alcohol and/or unsaturated polycarboxylic acid or anhydride groups such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidezed vinyl cyclohexene and epoxidized dimer of cyclopentadiene.

Another group comprises the epoxidized polymers and copolymers of diolefins, such as butadiene. Examples of this include, among others, butadiene-acrylonitrile copolymers, butadiene-styrene copolymers and the like.

Another group comprises the glycidyl-containing nitrogen compounds, such as diglycidyl aniline and di- and triglycidylamine.

The polyepoxides that are particularly preferred for use in the composition of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. Patent No. 2,633,458 are good examples of polyepoxides of this type.

Other mono-epoxides which contain an active halogen compound such as trichlorobutylene oxide may be used as the polyfunctional epoxide.

Component B

The polyamines to be used in this invention include those organic materials possessing a plurality of amino hydrogen, i.e., a plurality of

groups wherein N is an amino nitrogen. These include the aliphatic, cycloaliphatic, aromatic or heterocyclic polyamines as well as derivatives thereof as long as the derivatives still contain the necessary amino hydrogen.

Suitable examples of these materials include, among others, the aliphatic polyamines such as, for example, ethylenediamine, diethylenetriamine, triethylenetetramine, tetraethylenepentamine, 1,4-diaminobutane, 1,3-diaminobutane, hexamethylenediamine, 3-(N-isopropylamine) propylamine, N,N'-diethyl-1,3-propanediamine, hexapropyleneheptamine, penta(1-methyl-propylene) hexamine, tri(1,2,2-trimethylethylene) tetramine, tetra(1,3-dimethylpropylene) pentamine, penta-(1,5-dimethylamylene) hexamine, penta-(1,2-dimethyl-1-isopropylethylene) hexamine and N,N'-dibutyl-1,6-hexanediamine and N,N'-dibutyl-1,6-hexanediamine.

Suitable aliphatic polyamines are the alkylene polyamines of the formula

wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula

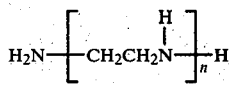

wherein n is an integer varying from about 2 to 8. A mixture of high molecular weight polyethlene polyamines and diethylenetriamine is especially preferred.

Suitable polyamines include polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming or copolymers having groups reactive with amines such as, for example, aldehyde groups, as present on acrolein and methacrolein polymers, and reacting these materials with monomeric amines to form the new polymeric polyamines. Polymeric amines can also be formed by preparing polymers containing ester groups, such as, for example, a copolymer of octadecene-1 and methylacrylate, and then reacting this with a polyamine so as to effect an exchange of an ester group for an amide group and leave the other amine group or groups free. Polymers of this type are described in U.S. Pat. No. 2,912,416.

Suitable polyamines include the polyamines possessing cycloaliphatic ring or rings, such as, for example,
1-cyclohexylamino-3-aminopropane,
1,4-diaminocyclohexane,
1,3-diaminocyclopentane,
di(aminocyclohexyl) methane,
di(aminocyclohexyl) sulfone,
1,3-di(aminocyclohexyl) propane,
2,4-diaminocyclohexane,
N,N'diethyl-1,4-diaminocyclohexane, and the like.

Preferred members of this group comprise those polyamines having at least one amino or alkyl-substituted amino group attached directly to a cycloaliphatic ring containing 5 to 7 carbon atoms.

Other suitable polyamines comprise the aminoalkyl-substituted aromatic compounds such as, for example, di(aminoethyl) benzene, di(aminomethyl) benzene, tri(aminoethyl) benzene, tri(aminobutyl) naphthalene and the like.

Suitable polyamines also include the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkosilylpropylamines like triethoxysilylpropylamines.

Other suitable polyamines include the N-(aminoalkyl piperazines, such as, for example, N-aminobutylpiperazine, N-aminoisopropyl-b 3-butoxypiperazine, N-aminoethylpiperazine, 2,5-dibutyl-N-aminoethylpiperazine, 2,5-dioctyl-N-aminoisobutylpiperazine and the like.

Another group of suitable materials are obtained by reacting the above-described polyamines with a monopoxide. Examples of these reactants include, among others, ethylene oxide, propylene oxide, styrene oxide, phenyl glycidyl ether, allyl glycidyl ether, octadecyl glycidyl ether, tolyl glycidal ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like. This reaction between polamines and monoepoxide is effected merely by bringing the components together in proper proportion. The adducts are obtained when a mol of the polyamine is reacted with not more than one mol of monoepoxide. The excess amine can be retained or can be removed by distillation. Example of the monoepoxidepolyamine reaction products include, among other, N(hydroxypropyl) diethylenetriamine (reaction products of propylene oxide and diethylenetriamine) and N(2-hydroxy-3-phenoxypropyl) diethylenetriamine (reaction product of phenyl glycidyl ether and diethylenetriamine).

A group of related materials are those soluble fusible products obtained by reacting a polyepoxide with a monoamine. Examples of polyepoxides that may be used include any of the present invention. Examples of the monoamines include any of those noted above for use in the compositions of the present invention. Examples of the monoamines include, among others, secondary amines such as dimethylamine, diethylamine, dipropylamine, dibutylamine, di(tert-butyl) amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Other examples include the soluble reaction products of polyepoxides and the polyamines and salts thereof, such as described in U.S. Pat. Nos. 2,640,037 and 2,643,239.

Still other derivatives that may be employed include those obtained by reacting the polyamines with acrylates, such as methyl acrylate, ethyl acrylate, methyl methacrylates and the like. In this case, there is an exchange of the ester linkage for an amide linkage, one of the polyamine nitrogen being involved in the said amide linkage.

Another suitable group of derivatives that may be used in the process of the invention include those soluble and fusible products obtained by reacting the polyamines noted above with unsaturated nitriles, such as acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoelkylated polyamines include those of the formula

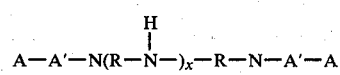

wherein x represents an integer in the range of 0 through 3 and A and A' represent a member selected from the group consisting of hydrogen and cyanoethyl radicals, and further characterized in that the amine has at least one cyanoethyl group and at least one nontertiary amino group in the molecule. The preferred members of this group comprise the cyanoethylated aliphatic and cycloaliphatic polyamines containing up to 18 carbon atoms.

Other suitable materials include the imidazoline compounds prepared by reacting monocarboxylic acids with polyamines. These may be represented by the formula

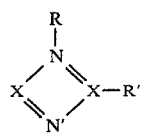

wherein X is an organic radical and preferably an alkylene radical, R' is a long-chain hydrocarbon radical, and preferably one containing at least 12 carbon atoms, and R is an organic radical containing an amine or amine-substituted group. Particularly preferred members of this group are those obtained by reacting any of the above-described polyamines with long-chain monocarboxylic acids, such as those containing at least 12 and preferably 16 to 30 carbon atoms, such as, for example, palmitic acid, pentadeconoic acid, 4-ketomyristic acid, 8,10-dibromostearic acid, margaric acid, stearic acid, alphachlorostearic acid, linoleic acid, oleic acid, dehydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about 0.3 to 0.7 to 1, and preferably about 0.3 to 0.5 to 1. The temperature employed preferably varies from about 100° C. to 250° C.

Suitable polyamines include the aromatic polyamines, especially those having at least two -NH₂ groups attached to aromatic ring or rings and containing up to 25 carbon atoms.

Suitable polyamines include the sulfur- and/or phosphorus-containing polyamines such as may be obtained by reacting a mercaptan- or phosphine-containing active hydrogen with an epoxy halide to form a halohydrin, dihydrochlorinating and then reacting the resulting compound with a polyamine. N-(3-ethylthio-2-hydropropyl) diethylenetriamine may be prepared, for example, by reacting ethyl mercaptan with epichlorohydrin, dihydrochlorinating and then reacting the resulting epoxy compound with diethylenetriamine. Suitable examples of such compounds include, among others, N-(3-butylthio-2-hydroxypropyl) triethylenetetramine,
N-(4-phenylthio-3-hydrobutyl) pentamethylenetetramine,
N-(4-cyclohexylthio-3-hydrobutyl) ethylenediamine,
N-(4-cyclohexylthio-3-hydrobutyl) ethylenediamine,
N-(3-cyclohexylthio-2-hydropropyl) hexamethylenediamine,
N-(3-diphenylphosphino-2-hydroxypropyl) triethylenetetramine,
N-(3-dicyclohexylphosphino-2-hydroxypropyl) pentamethylenetetramine,
N-(3-dididecylphosphino-2-hydroxyhexyl) diethylenetriamine,
N-3-(allylthio-2-hydroxypropyl) hexamethylenediamine.

The N-(allylthio-hydroxyallyl) aliphatic and aromatic polyamines, the N-(cycloalkylthiohydroxy-alkyl) aliphatic and aromatic polyamines and the N-(arylthiohydroxyalkyl) aliphatic and aromatic polyamines may also be used in this invention. Preferred phosphorus-containing curing agents include the N-(dialkylphosphinohydroxyalkyl) aliphatic and aromatic polyamines, the N-(dicycloallyl phosphinohydroxyalkyl) aliphatic and aromatic polyamines and the N-(diarylphosphinohydroxyalkyl) aliphatic and aromatic polyamines.

Suitable polyamines include the polyamines of the formula

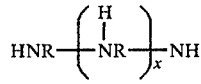

wherein x is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acid containing up to 20 carbon atoms.

Salts of polyamines and fatty acid (e.g., stearic, linoleic acid, dicanoic acid, lauric acid, oleic acids and the like) may be used in this invention.

Activators which may be employed with the above-described polyamines include those organic compounds having a carbon atom attached to at least three different nitrogen atoms (one nitrogen atom of which may be replaced by sulfur) and having at least one hydrogen attached to one of the nitrogen atoms. Included in the group of activators are dicyandiamide, thioammeline, dithiobiuret, ethylenethiourea, diallylmelamine, actoquanamine, melamine, guanylurea, benzoquanamine, benzoyldicyandiamide, quanazole, 3-amino-1,2,4-triazole, monomethyloldicyandiamide, thiosemicarbazide, triaminomelamine, phenylbiguanide, guandine and the like. Preferred compounds are dicyandiamide and substituted dicyandiamides, e.g., compounds of the formula

wherein R is an organic radical such as a hydrocarbon radical or a nitrogen-, ether-, ketone-, halogen-, OH—, etc., substituted hydrocarbon radical. Also preferred are those of the formula

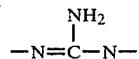

wherein the free bonds are attached to organic radicals as noted above which may be open-chain or contained in a cyclic structure. The amount of the accelerator may vary from about 0.1 to 12 parts per 100 parts of the epihalohydrin and polyepoxide and preferably from 3 to 6 parts per 100 parts of the epoxy compounds (epihalohydrin and polyepoxide). The accelerator may be added to the polyamine or mixed simultaneously with the other components.

Any suitable modifying or additive compounds may be used in the reaction of this invention to vary properties of the product. Typical additives include dicarboxylic anhydrides, dicarboxylic acids, polyols, polysulfide polymers, alkali sulfides, sodium polysulfide, aminoplasts, phenoplasts, fatty or rosin acids, furfural-ketone resins, aldehydes, ketones, dibutyl phthalate, tricresyl phosphate, polyamides, fatty acid diamines, styrene oxides, acetonitrite, primary sulfonamides, secondary aromatic sulfonamides, disecondary sulfonamides, polymerized oils, carbon disulfide, sulfur, soya bean oil, polyamide resins, wood flour, wood fibers, cellulose lignin, cellulose derivatives, polyester polymers, polyether polymers, poly (acrylic acid) polymers, vegetable oils, melamine, furan compounds, vinyl monomers and polymers, phenols, allyl alcohol, allyl-type halide compounds and polymers, alkali metal cyanides, isocyanate compounds and polymers, urethane prepolymers, polyisocyanates, thioplasts, furan resins, alginic acid, aliphatic dienes, vinyl monomers and polymers, halogenated aliphatic and aromatic compounds, triallyl cyanurate, heterocyclic vinyl compounds and polymers, diethyl oxalate, diallyl phthalate, sulphonated castor oil, paraffin oil, polyepichlorohydrin polymer, aminosilicate compounds and aminosilicate aldehyde resins, phenol silicate compounds and aldehyde phenol silicate resins, organic resins, organic polyhydroxy silicate compounds and polymers, epoxy silicate polymers, acrylic silicate compounds and polymers, acrylate silicate compounds and polymers, poly(urethane silicate) prepolymers, poly(allyl alcohol silicate) copolymer, lignin silicate, alkali metal cyanide silicoformic acid, dicyanide silicoformic acid, cyanide silicoformic acid, alkali metal dicyanide and cyanide silicate, cyanide and dicyanide silicate, cyanide and dicyanide silicate, alkali metal salts of dicarboxylic organic acids, poly(furfuryl alcohol) polymer and mixtures thereof.

Various aldehydes such as formaldehyde, acetaldehyde, butylaldehyde, furfural, crotonaldehyde, acrolein and paraformaldehyde may be used in this process and may also be used in this process as polyaldehyde polymers.

The amount of modifying, additive or copolymer may be varied greatly from a small amount to up to equal weight of the epoxy prepolymer. The copolymer or modifying and additive compounds and resins may be added in the first step in the production of the epoxy prepolymer or may be added after the epoxy prepolymer has been produced, but before the prepolymer begins to expand.

The epoxy cellular solid products may be modified by adding an alkali compound to react with epoxy compounds containing a halide, to improve the strength and decrease the hydroscopic properties. The cellular solid becomes more elastic and does not tear as easily. The alkali compound is added in the ratio of about 0.5 to 1 mol per mol of the epoxy compound containing a halide. The alkali compounds include sodium hydroxide, potassium hydroxide, sodium oxide, potassium oxide, sodium polysulfide, sodium carbonate, potassium carbonate, sodium cyanide, potassium cyanide, soda lime, calcium hydroxide, alkali metal salts of dicarboxyl acids, alkali metal phenols, alkali metal polyhydroxy aliphatic and aromatic compounds, alkali metal salts of poly(acrylic acid) polymers and poly(methacrylic acid) polymer, ammonium, ammonia salts of weak acids and mixtures thereof.

Additives may be added to emulsify the mixture, to modify the cells in the cellular solid, to regulate the foaming and to stabilize the cellular solid. The mixture may be emulsified with alkali soaps, metallic soaps such as zinc stearate and calcium stearates, and detergents. The cells in the cellular solid may be modified, regulated and stabilized by the addition of additives such as metallic powders, ethyl cellulose, chlorinated natural rubber, polyvinyl acetate, polyvinyl chlorides, metallic salts, metallic oxides and hydroxides, alkylated phenoxy compounds, polyethoxy ethanol, sodium dioctyl sulfosuccinate, dioctyl calcium sulfosuccinate, dioctyl sulfosuccinate, methyl morpholine, diethylethanolamine, polyethersiloxanes, dimethyl ethanol amine, manganous chloride and mixtures thereof.

The epoxy prepolymer will react chemically with polyisocyanate compounds and isocyanate-terminated urethane prepolymers to produce cellular solid reaction products. Any suitable polyisocyanate may be used such as arylene polyisocyanates, alkylene polyisocyanates, and triphenylmethane triisocyanate. These polyisocyanate compounds may first be reacted with polyols, hydroxy-containing or carboxyl-containing polyesters, polyethers, polysulfides and polybutadienes to produce isocyanate-terminated urethane prepolymers. The preferred polyisocyanate is toluene diisocyanate, especially a mixture of the 2,4-isomer and the 2,6-isomer.

The epoxy cellular solid products are made by slowly adding a suitable epoxy compound such as epichlorohydrin to an organic polyamine compound such as diethylenediamine, in the ratio of 1 to 3 mols of the epoxy compound to 1 mol of the polyamine compound, while agitating and keeping the temperature between 20° C. to 70° C. for 10 to 60 minutes or until the reaction is substantially complete, thereby producing an epoxy prepolymer. The prepolymer may be stored in a closed container until it is used to produce foam. The foam regulator may be added in the production of the prepolymer or to the epoxy prepolymer. The foam regulator is not essential, but is desirable. Various additives, fillers, organic and inorganic foam stabilizers, emulsifiers, flame-retarding agents, plasticizers, stabilizers against aging and weathering, fungicidal and bacteriocidal substances, dyes, cell regulators and blowing agents may be added to the epoxy prepolymer.

The epoxy prepolymer may be poured into a mold, then heated to 80° C. to 100° C., and the original volume expands 3 to 10 times to produce an epoxy cellular solid product. The epoxy cellular solid products may be foamed in the form of large slabs, then cut into the desired width and thickness and used for thermal and sound proofing in buildings, cars, airplanes, clothing, etc., for protection of fragile articles in shipping, for flotation in boats, for manufacturing of pillows, cushions, lined cloth, furniture, air filters, etc. The rigid epoxy foams may be foamed in place or cut into the desired width and thickness and may be used as construction elements in buildings, boats, airplanes, etc.

The epoxy propolymer may be foamed in place by the use of mechanical spray apparatus which contains a heating element which heats the epoxy prepolymer to 80° C. to 100° C. to start the foaming process just before it is sprayed in place. Once the foaming process starts, the heat produced by the chemical reaction keeps the foaming reaction going. The foaming process may also be started by the addition of known epoxy catalysts such as amines, Lewis acids and any other organic or inorganic chemical that will react with the epoxy prepolymer or with an additive to increase the temperature of the mixture to above 80° C.

The epoxy prepolymer may be mixed with epoxy resins containing 2 or more reactive epoxy groups, such as those which are commercially available, in the ratio of 4 parts by weight of the epoxy prepolymer to 1 to 8 parts by weight of the epoxy resin; then the mixture is foamed in place or foamed in a mold to produce tough, rigid, cellular solid products by heating the mixture to above 80° C. This foam has very good adhesive properties. It may be used as insulating materials, cavity fillings, packaging materials, building materials, lightweight building bricks in the form of sandwiches, e.g., with metal-covering layers, for house building and the construction of motor vehicles, boats and aircraft. These foaming mixtures may easily be sprayed; they may form effective protective walls and protective layers in mines by spraying them on fabric, or other surfaces, wire meshes or even directly onto the walls. The foaming mixtures may also be used, e.g., in underground and surface engineering and road building, for the erection of walls and igloos, for sealing joints, for sealing and plastering surfaces, for priming, insulating and decorating and as coating, flooring compositions and as lining material. They may also be used as adhesives, mortars or casting compositions, with or without inorganic or organic fillers. These rigid foams may be lacquered, metallized, coated, laminated, galvanized, vapor treated, bonded or blocked. The shaped products may undergo further shaping processes, for example, by sawing, cutting, drilling, planing, polishing or other processes.

The epoxy foams may be modified by additives such as other epoxy compounds, alkali metal compound, alkali metal polysulfides, lignin, polyhydroxy compounds, vegetable oils, polyisocyanates, allyl halides, aldehydes, furfuryl alcohol, poly(furfuryl alcohol) polymer, aminoplast resins, phenoplast resins, furfuralketone resins, poly(furfural lignin) polymer, vinyl polymer, vinyldiene copolymers, allyl halide compounds, vinyl monomers, alkali metal alcolates, liquid polysulfides and mixtures thereof, to improve the strength, to decrease the hydroscopic properties and to improve its elasticity. The epoxy forms which are modified may be used for the same purposes as stated for the epoxy foams.

An alkali metal compound such as sodium hydroxide and alkali metal polysulfides, which may be in a concentrated aqueous solution, reacts with the halogen atoms present to produce a tough, elastic foam which may be used as a padding under carpets, as a rubber substitute, in manufacturing of furniture and cushions, etc.

The epoxy propolymers may be used as the blowing agent and react with many organic liquid polymers, aqueous emulsion or suspensions of organic polymers, organic polymers in an organic solvent to produce organic polymer-epoxy foam. Suitable organic polymers include, but are not limited to, vinyl polymers, organic diene polymers, vinyl-diene copolymers, allyl halide polymers, vinyl-allyl halide copolymers, aminoplast resins, phenoplast resins, aminoplast silicate resins, phenoplast silicate resins, polyether glycol, polyester resins, polyamide resins, polyaldehyde polymers, polyketone polymers, polysulfide polymers, furfuralketone resins, acrylate-silicate resins, isocyanate-terminated polyurethane prepolymers, polyisocyanate silicate prepolymers, epichlorohydrin polymer and mixtures thereof, and may be used in this invention. About 1 part by weight of the epoxy prepolymer is reacted with 1 to 20 parts by weight of the organic polymer by thoroughly mixing, then heating to 80° C. to 100° C., and the mixture expands 3 to 10 times its original volume to produce a tough epoxy foam. The organic polymer, e.g., polyvinyl acetate polymer in an aqueous suspension, in most cases may be mixed with the polyamine; then the epoxy compound, e.g., epichlorohydrin, is slowly added while agitating. When all the epoxy compound is added, the temperature rises, due to the chemical reaction's being sufficiently high to initiate foaming. The mixture expands 3 to 10 times its original volume to produce a tough epoxy foam.

The epoxy prepolymer may be mixed with molding powder of organic polymers which have softening or melting points below 170° C., then heated to 80° C. to 100° C. to initiate the chemical reaction to produce the foaming. This chemical reaction elevates the temperature to 150° C. to 200° C., thereby softening or melting the organic polymers, thereby producing an organic foam product. Suitable organic polymers include, but are not limited to, polyethylene, polypropylene, polystyrene, poly(allyl chloride), phenoplast, aminoplast, poly(vinyl acetate), poly(acrylic acid compounds), poly(acrylate compounds), poly(allyl alcohol), cellulose acetate, ethyl cellulose and mixtures thereof.

Epoxy prepolymer may be used to react with, foam and cure a liquid organic polymer by adding about 2 parts by weight of the epoxy prepolymer with 1 to 10 parts by weight of the liquid polymerized organic polymer, then heating the mixture to 80° C. to 100° C. while agitating the mixture until the mixture begins to expand. It expands 3 to 10 times its original volume, thereby producing an epoxy-organic polymer cellular solid product. Suitable organic polymers include, but are not limited to, poly(vinyl monomer), poly(organic dienes), poly(allyl halides), copolymers of vinyl monomers, copolymers of vinyl monomers with organic dienes and/or allyl halides, polyamides, polyesters, phenoplasts, aminoplasts, phenoplast silicates, aminoplast silicates, poly(acrylate silicates), polyether glycols, poly(ketone-furfural), isocyanate-terminated polyurethane prepolymers, poly(allyl alcohol), poly-epichlorohydrin, polyester silicate, poly(allyl silicate), poly (allyl alcohol) silicate, poly(acrylate silicate), poly(urethane silicate) prepolymer, polyisocyanate silicate prepolymer and mixtures thereof.

Suitable polymerized vinyl monomers include, but are not limited to, polyacrylonitrile, polymethacrylonitrile, polystyrene, poly(vinyl acetate), poly(vinyl chloride), poly(vinylidene chloride), poly(acrylic acid), poly(methacrylic acid), poly(hydroacrylic acid), poly(chloroacrylic acid), poly(ethyl acrylic acid), poly(crotonic acid), poly(fluoroacrylic acid), poly(cyclohexyl methacrylic acid), poly(isobutyl methacrylic acid), poly(bromoacrylic acid), poly(benzyl acrylic acid), poly(methyl methacrylate), poly(methyl acrylate), poly(ethyl acrylate), poly(propyl acrylate), poly(butyl acrylate), poly(pentadecyl acrylate), poly(hexadecyl acrylate), poly(benzyl acrylate), poly(cyclohexyl acrylate), poly(phenyl ethyl acrylate), poly(ethyl methacrylate), poly(methyl α-chloroacrylate), poly(2-chloroethyl acrylate), poly(1,1-dihydrofluorobutyl acrylate), poly(cyclohexyl-cyclohexyl methacrylate), poly(allyl methacrylate and mixtures thereof.

Suitable polymerized allyl halide polymers include poly (allyl chloride), poly(allyl bromide), poly(methallyl chloride), poly(methallyl bromice) and mixtures thereof.

Suitable polymerized organic diene compounds include polybutadiene, polyisoprene, polychloroprene, polycyclopentadiene and mixtures thereof.

The vinyl monomers, allyl halides and organic dienes may be copolymerized and used in this invention.

Other polymerized organic compounds may be suitable for this invention such as polyvinyl alcohol, polyallyl alcohol, poly(vinyl ketals), poly(vinyl acetals), poly(n-vinyl carbazole), poly(vinyl pyrrolidone), poly(furfural lignin), poly(furfural ketone), phenoplasts, poly(furfuryl alcohol), polyaldehydes, phenoplast silicates, aminoplast silicates and mixtures thereof.

Other polymerable organic compounds such as vinyl monomers, allyl halides, allyl alcohol organic dienes, organic oxides and mixtures thereof may be polymerized or reacted with the epoxy compound and polyamine in the ratio of 0.5 to 5 parts by weight of the polymerable organic compound, 1 to 3 parts by weight of the polyamine and 1 to 5 parts by weight of epichlorohydrin to produce an epoxy prepolymer. In certain cases, the polymerization is enhanced or improved by the addition of an initiator such as organic or inorganic peroxides, alkali metal persulfate, ammonium persulfate, redox systems, peroxides with a metal catalyst, azo compounds and other initiators. The epoxy prepolymer may be mixed with up to about equal parts by weight of additives such as organic or inorganic fillers, plasterizers, extenders, foam regulators, foam stabilizers, emulsifiers, flame-retardant agents, dyes, cell regulator, blowing agents, fungicidal and bacteriocidal agents and stabilizers against weathering and aging atents.

The polyamine may be selected from the group consisting of alkylenepolyamines, polyalkylenepolyamines, arylenepolyamines, polyamide polymers containing 2 or more free amine groups per molecule, polyamine condensation products with halohydrins containing 2 or more free amine groups per molecule and mixtures thereof. Poly(alkylene) polyamines with the general formula of $NH_2(CH_2)_y(NH)_x-H$ in which x is a number having an average value from 2 to 6, including integral as well as mixed numbers, and y is an integer having a value of 2 to 8, may be used in this invention.

Alkylene oxides such as ethylene oxide, propylene oxide and mixtures thereof may be used in this invention. It is preferred that they be added to a polyamine in an aqueous solution. A minimum amount of water is used. The alkylene oxides may be added simultaneously with the epoxy compound. The ethylene oxide may be added to the polyamine in the form of a gas or a liquid under pressure in a closed system. About 0.5 to 2 parts by weight of the alkylene oxide is added to 1 to 3 parts by weight of the polyamine in 0.5 to 2 parts by weight of water. The ethylene oxide is added in a closed system at a slow rate at 0 to 15 cm. of mercury above atmospheric pressure, and the temperature is kept between 20° C. to 70° C. while agitating for 0.5 to 12 hours. When the reaction is complete, the pressure drops down to atmospheric or to a negative pressure. The epoxy compound is then slowly added to the mixture while agitating and keeping the temperature between 20° C. to 70° C., thereby producing an epoxy prepolymer. The epoxy prepolymer is then poured into a mold and heated to 80° C. to 100° C., and the mixture expands 3 to 10 times its original volume, thereby producing a flexible, tough, cellular solid product.

The alkylene oxide and epoxy compound may be added simultaneously in the same ratio as above to the aqueous solution of polyamine in a closed system at 0 to 15 cm. of mercury above atmospheric pressure. The temperature is kept between 20° C. to 70° C. while agitating for 0.5 to 12 hours, thereby producing an epoxy prepolymer. The epoxy prepolymer is then poured into a mold and heated to 80° C. to 100° C. The mixture expands 3 to 10 times its original volume to produce a flexible cellular solid product. The product may be modified by adding alkali metal oxides, carbonates or hydroxides, other polymerable organic compounds, polyvinyl polymers, or any of the other modifiers listed in this invention.

The primary object of the present invention is to produce epoxy cellular solid reaction products. Another object is to produce liquid epoxy prepolymers that may be poured into molds of useful products, then heated, and it expands into a cellular solid. Still another object is to produce a cellular solid product that may be used as insulation material, to protect fragile objects when they are shipped. Another object is to produce a cellular solid which is biodegradable.

DESCRIPTION OF PREFERRED EMBODIMENTS

My invention will be illustrated in greater detail in the specific examples which follow, which detail the preferred embodiments of my process. It should be understood that the scope of my invention is not limited to the specific processes set out in Examples. Parts and percentages are by weight, unless otherwise indicated.

EXAMPLE 1

About 3 mols of epichlorohydrin are slowly added to 2 mols of ethylenediamine while agitating and keeping the temperature between ambient and 70° C. for about 30 minutes to 24 hours, thereby producing an epoxy prepolymer. The amount of time required varies with the volume of reactants and the method used to cool the reactants.

The prepolymer is then poured into a mold and heated to 80° C. to 100° C. and the prepolymer begins to expand. It expands 3 to 12 times its original volume, thereby producing an epoxy cellular solid. The cellular solid is rigid at first, but slowly becomes flexible within 12 hours.

EXAMPLE 2

About 3 mols of epichlorohydrin are slowly added to 2 mols of diethylenetriamine while agitating at ambient pressure and keeping the temperature between ambient temperature and 70° C. for 30 minutes to 12 hours, thereby producing an epoxy prepolymer.

About 4 parts by weight of the prepolymer and 1 part by weight of magnesium oxide powder are mixed thoroughly, then heated to 80° C. to 100° C., and the mixture expands 3 to 12 times its original volume, thereby producing a cream-colored, flexible epoxy cellular solid reaction product.

EXAMPLE 3

About 4 parts by weight of the epoxy prepolymer as produced in Example 2 and 1 part by weight of aluminum hydroxide powder are mixed thoroughly, then heated to 80° C. to 100° C., and the mixture expands 3 to 12 times its original volume, thereby producing a free-standing, flexible cellular solid.

EXAMPLE 4

About 2 parts by weight of propylenediamine and 0.5 part by weight of magnesium oxide are mixed; then 2.5 parts by weight of epichlorohydrin are slowly added while agitating and keeping the temperature between ambient temperature and 70° C. for 30 minutes to 12 hours, thereby producing a thick, liquid, epoxy prepolymer.

The epoxy prepolymer is then heated to 80° C. to 100° C. while agitating until the mixture begins to expand; it expands 3 to 12 times its original volume, thereby producing a flexible epoxy cellular solid.

EXAMPLE 5

About 1 part by weight of epichlorohydrin is slowly added to 1 part by weight of 1,6-hexamethylenediamine while agitating and keeping the temperature between ambient temperature and 70° C. for 30 minutes to 12 hours, thereby producing liquid epoxy prepolymer.

The epoxy prepolymer is then poured into a mold of useful products, heated to 80° C. to 100° C., and the mixture begins to expand; it expands 3 to 12 times its original volume, thereby producing an epoxy cellular solid reaction product.

EXAMPLE 6

An epoxy cellular solid reaction product is produced as in Example 5, except that 0.5 part by weight of magnesium hydroxide powder is added to the epoxy prepolymer before it is heated.

EXAMPLE 7

An epoxy cellular solid reaction product is produced as in Example 5, except that 0.5 part by weight of sodium citrate is added to the epoxy prepolymer before it is heated.

EXAMPLE 8

About 2 mols of aqueous formaldehyde and 3 mols of ethylenediamine are mixed, then heated to 70° C. to 100° C. for 20 to 60 minutes until most of the water evaporates and a thick liquid aminoplast is produced.

About 3 mols of epichlorohydrin are slowly added to the liquid aminoplast while agitating and keeping the temperature between ambient and 70° C. for 30 minutes to 12 hours, thereby producing a thick liquid epoxy prepolymer.

About 4 parts by weight of the epoxy prepolymer are mixed with 0.5 part by weight of magnesium oxide powder, then heated to 80° C. to 100° C. The mixture expands 3 to 12 times its original volume, thereby producing an epoxy cellular solid reaction product.

EXAMPLE 9

About 1 part by weight of furfural and 2 parts by weight of ethylenediamine are mixed thoroughly; then 2.5 parts by weight of epichlorohydrin are slowly added while agitating and keeping the temperature between 20° C. to 70° C. for 30 minutes to 12 hours, thereby producing a thick liquid epoxy prepolymer.

The epoxy prepolymer is mixed with 1 part by weight of magnesium carbonate powder, then heated to 80° C. to 100° C., and the mixtures expands 3 to 12 times its original volume, thereby producing a self-standing, flexible epoxy cellular solid reaction product.

EXAMPLE 10

About 2 parts by weight of furfuryl alcohol, 2 parts by weight of dipropylenetriamine and 1 part by weight of propylamine are mixed; then 3 parts by weight of epichlorohydrin are slowly added while agitating and keeping the temperature between ambient temperature and 70° C. for 30 minutes to 12 hours, thereby producing an epoxy prepolymer.

The epoxy prepolymer is mixed with 0.2 part by weight of calcium carbonate powder, then heated to 70° C. to 80° C. The mixture expands 3 to 12 times its original volume, thereby producing a flexible epxoy cellular solid reaction product.

EXAMPLE 11

2 parts by weight of crotonaldehyde and 2 parts by weight of tetraethylenepentamine are mixed; then 3 parts by weight of epichlorohydrin are slowly added while agitating at ambient pressure and keeping the temperature below 70° C. for 30 minutes to 12 hours, thereby producing a liquid epoxy prepolymer.

About 4 parts by weight of the liquid epoxy prepolymer and 0.5 part by weight of manganese oxide are mixed, then heated to 80° C. to 100° C., and the mixture expands 3 to 12 times its original volume, thereby producing a flexible cellular solid.

EXAMPLE 12

About 2 parts by weight of acetone and 2 parts by weight of ethylenediamine are mixed; then 3 parts by weight of epichlorohydrin are slowly added while agitating and keeping the temperature below 70° C. for 30 minutes to 12 hours, thereby producing a liquid epoxy prepolymer.

About 0.5 part by weight of zinc oxide powder and 3 parts by weight of the liquid epoxy prepolymer are mixed, then heated to 80° C. to 100° C. The mixture expands 3 to 12 times its original volume, thereby producing a flexible cellular solid reaction product.

EXAMPLE 13

About 1 part by weight of thick liquid phenoplast (produced by reacting 1 mol of cresol and 3 mols of aqueous formaldehyde), 1 part by weight of sodium hydroxide flakes and 2 parts by weight of a mixture of polyethylenepolyamine are mixed; then 3 parts by weight of epichlorohydrin are slowly added while agitating at ambient pressure and keeping the temperature below 70° C. for 30 minutes to 12 hours, thereby producing a thick, liquid epoxy prepolymer.

About 4 parts by weight of the prepolymer and 0.5 part by weight of powdered chalk are mixed, then heated to 80° C. to 100° C. while gently agitating, and the mixture expands 3 to 12 times its original volume to produce a semi-rigid epoxy cellular solid.

EXAMPLE 14

Production of epoxy cellular solid by using 2 separate mixtures:

(A) One part by weight of sodium hydroxide flakes, 2 parts by weight of water, 2 parts by weight of 1,6-hexanediamine and 2 parts by weight of epichlorohydrin are mixed, then heated to about 60° C. to 70° C. for 10 to 30 minutes, thereby producing a thick, liquid epoxy prepolymer.

(B) 2 parts by weight of propylenediamine and 1 part by weight of magnesium oxide powder are mixed, then 3 parts by weight of epichlorohydrin are slowly added while agitating and keeping the temperature below 70° C., thereby producing a thick, liquid epoxy prepolymer.

The A and B epoxy prepolymers are mixed. Then 0.01 part by weight of sodium dioctyl sulfosuccinate is added and thoroughly mixed. The mixture is then heated to 80° C. to 100° C. and the mixture expands 6 to 8 times the original volume, thereby producing a semi-rigid epoxy cellular solid reaction product.

EXAMPLE 15

Production of epoxy cellular solids by using 2 separate steps:

(A) About 2 parts by weight of ethylenediamine and 1 part by weight of aluminum hydroxide are mixed; then 3 parts by weight of epichlorohydrin are slowly added while agitating at ambient pressure and keeping the temperature below 70° C., thereby producing a thick epoxy prepolymer.

(B) 2 parts by weight of epichlorohydrin and 0.25 part by weight of concentrated phosphoric acid are mixed, then agitated for 10 to 20 minutes at ambient temperature, thereby producing polyepichlorohydrin polymer. About 1 part by weight of sodium hydroxide flakes is added to the mixture, then heated to just above the melting point of sodium hydroxide flakes, thereby producing a tan polyepichlorohydrin polymer.

A and B mixtures are mixed thoroughly, then heated to 80° C. to 100° C. The mixture expands 5 to 8 times its original volume to produce an epoxy cellular solid which is then heated in an oven at 80° C. to 120° C. for 1 to 2 hours to produce a semi-rigid, light-gray-colored, tough, epoxy cellular product.

EXAMPLE 16

3 parts by weight of epichlorohydrin and 2 parts by weight of epoxidized castor oil, containing 2 or more reactive epoxy groups per molecule, are mixed. The mixture is slowly added to 2 parts by weight of triethylenetetramine, containing 1 part by weight of aluminum powder, while agitating and keeping the temperature below 70° C., thereby producing a thick, liquid epoxy prepolymer which is then heated to 80° C. to 100° C. The mixture expands 3 to 12 times its original volume, thereby producing a flexible, tough, epoxy cellular solid reaction product.

EXAMPLE 17

About 2 parts by weight of ethylenediamine and 0 part by weight of magnesium oxide powder are mixed; then 2 parts by weight of epichlorohydrin are slowly added while agitating and keeping the temperature below 70° C. When this mixture is to be used, 1 part by weight of epichlorohydrin is added and thoroughly mixed at ambient temperature. The chemical reaction is exothermic and the temperature is elevated above 80° C. The mixture expands 3 to 12 times its original volume to produce a flexible, self-standing epoxy cellular solid reaction product.

Other alkyl-type halide compounds, having the general formula of

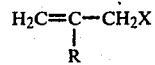

wherein R is a hydrogen or a $C_1$ to $C_4$ alkyl group and wherein X represents a halogen atom, may be used.

EXAMPLE 18

About 1 part by weight of sodium hydroxide flakes and about 1 to 2 parts by weight of sulfur are mixed, then heated to above the melting temperature of sulfur while agitating for 10 to 20 minutes, thereby producing a sodium hydroxide polysulfur reaction product. To this mixture, 2 parts by weight of an amino-terminated polymerized oil resin and 1 part by weight of magnesium hydroxide are added and thoroughly mixed. To this mixture, 3 parts by weight of epichlorohydrin are slowly added while agitating and keeping the temperature below 70° C. for 30 minutes to 12 hours, thereby producing a thick, liquid epoxy prepolymer.

The prepolymer is heated to 80° C. to 100° C. The mixture expands 3 to 12 times its original volume, thereby producing a light-yellow, rubbery, flexible epoxy cellular solid.

EXAMPLE 19

About 2 parts by weight of sulfate lignin, as produced by the Kraft process (soda process), 1 part by weight of ethylenediamine, 2 parts by weight of an organic amide compound (produced by reacting 3 mols of propylenediamine with 2 mols of phthalic anhydride) and 1 part by weight of iron oxide powder are mixed, then 3 parts by weight of epichlorohydrin are slowly added while agitating and keeping the temperature below 70° C. for 30 minutes to 12 hours, thereby producing a thick, liquid epoxy prepolymer.

The prepolymer is then heated to 80° C. to 100° C. and the mixture expands 3 to 12 times its original volume to produce a flexible, brown epoxy cellular solid reaction product. This product may be utilized for insulation and for the protection of fragile products in shipping.

EXAMPLE 20

About 1 part by weight of fine granular magnesium carbonate, 2 parts by weight of a liquid (300 to 1500 poises) polyester resin (produced by chemically reacting 15 mols of diethylene glycol and 1 mol of trimethylol propane with 15 mols of adipic acid) and 2 parts by weight of diethylenetriamine are mixed; then 3 parts by weight of epichlorohydrin are slowly added while agitating and keeping the temperature below 70° C. for 30 minutes to 12 hours, thereby producing a thick, liquid epoxy prepolymer. The prepolymer is poured into a mold of a useful product, then heated to 80° C. to 100° C. The mixture expands to 3 to 12 times its original volume, thereby producing a flexible, cream-colored, rubbery epoxy cellular solid reaction product.

EXAMPLE 21

About 1 part by weight of diethylenetriamine, 1 part by weight of 1,6-hexanediamine and 1.5 parts by weight of a liquid polyester resin (containing 1 mol of phthalic anhydride, 3 mols of maleic anhydride, 4 mols of ethylene glycol and 1 mol of styrene) are mixed; then 4 parts by weight of epichlorohydrin are slowly added while agitating and keeping the temperature below 70° C. for 30 minutes to 12 hours, thereby producing a thick, liquid epoxy prepolymer.

About 1 part by weight of magnesium oxide is mixed with the prepolymer, then heated to 80° C. to 100° C. The mixture expands 3 to 12 times its original volume to produce a free-standing epoxy cellular solid reaction product.

EXAMPLE 22

About 2 parts by weight of diethylenetriamine, 1 to 2 parts by weight of polyethylene glycol (200 to 500 molecules weight) and 1 part by weight of sodium hydroxide flakes are mixed; then 3 parts by weight of epichlorohydrin are slowly added while agitating and keeping the temperature below 70° C. for 30 minutes to 12 hours, thereby producing a thick, liquid epoxy prepolymer.

The epoxy prepolymer, 0.1 part by weight of iron powder, 0.3 part by weight of ethyl cellulose and 0.05 part by weight of manganous chloride are mixed, then heated to 80° C. to 100° C. The mixture expands 3 to 12 times its original volume, thereby producing a self-standing, flexible epoxy cellular solid reaction product.

EXAMPLE 23

About 1 to 2 parts by weight of unsaturated fatty acid, 0.5 part by weight of sodium hydroxide flakes and 1 part by weight of epichlorohydrin are mixed, then heated to just below the boiling temperature of epichlorohydrin for about 30 minutes. To this mixture, 1 part by weight of copper powder and 2 parts by weight of ethylenediamine are added and thoroughly mixed; then 2.5 parts by weight of epichlorohydrin are slowly added while agitating and keeping the temperature between 20° C. to 70° C., thereby producing a thick, liquid epoxy prepolymer. The epoxy prepolymer is then heated to 80° C. to 100° C. The mixture expands 3 to 12 times its original volume, thereby producing a self-standing epoxy cellular solid reaction product.

EXAMPLE 24

About 2 parts by weight of the epoxy prepolymer, as produced in Example 1, and 2 parts by weight of an epoxy resin, containing at least 2 reactive epoxy groups per molecule and produced by reacting epichlorohydrin with Bisphenol A, are thoroughly mixed, then heated to 80° C. to 100° C. The mixture expands 3 to 10 times its original volume to produce a tough, rigid epoxy cellular solid product.

EXAMPLE 25

About 1 part by weight of the epoxy prepolymer, as produced in Example 3, and 4 parts by weight of an epoxy resin, containing at least 2 reactive epoxy groups per molecule and produced by reacting epichlorohydrin with diglycidyl ether of bisphenol, are thoroughly mixed, then heated to 80° C. to 100° C. The mixture expands 3 to 10 times its original volume to produce a tough, rigid epoxy cellular product.

EXAMPLE 26

About 3 parts by weight of the epoxy prepolymer, as produced in Example 2, and 2 parts by weight of an epoxidized vegetable oil, containing 2 or more reactive epoxy groups per molecule, are thoroughly mixed, then heated to 80° C. to 100° C. The mixture expands 3 to 10 times its original volume, thereby producing a tough, rigid cellular product.

EXAMPLE 27

About 2 parts by weight of diethylenetriamine and 10 to 20 parts by weight of an aqueous suspension of a polymerized vinyl monomer, as listed below, are mixed; then 3 parts by weight of epichlorohydrin are slowly added while agitating and keeping the temperature between 20° C. to 70° C. for 30 minutes to 12 hours. The mixture is then heated to 80° C. to 100° C. It expands 3 to 10 times its original volume, thereby producing a tough, cellular product.

Any of the following aqueous suspensions of a polymerized vinyl monomer may be used; polymerized acrylic acid compounds, polymerized acrylate compounds, polystyrene, poly (acrylonitrile), poly(vinyl acetate), poly(vinyl chloride), polymethacrylonitrile, poly(vinylidene chloride), copolymers of vinyl monomers, organic dienes and allyl halides, and mixtures thereof.

EXAMPLE 28

About 5 parts by weight of the epoxy prepolymer, as produced in Example 1, are mixed with 10 to 20 parts by weight of styrene in ethylene dichloride, then heated to 80° C. to 100° C. while agitating until the mixture begins to expand, thereby producing an epoxy-styrene foam, a semi-rigid cellular product.

EXAMPLE 29

About 5 parts by weight of the epoxy prepolymer, as produced in Example 1, are mixed with 10 to 20 parts by weight of powdered polyethylene; then the mixture is heated to 80° C. to 100° C. while agitating until the mixture begins to expand, thereby producing an epoxy-polyethylene foam.

EXAMPLE 30

About 2 parts by weight of propylenediamine and 10 to 20 parts by weight of an aqueous emulsion of polyisoprene are mixed; then 3 parts by weight of epichlorohydrin are slowly added while agitating for 0.5 to 12 hours; then the mixture is heated to 80° C. to 100° C. while agitating until the mixture begins to expand, thereby producing an epoxy-polyisoprene cellular solid product.

EXAMPLE 31

About 5 parts by weight of the epoxy prepolymer, as produced in Example 2, and 10 to 20 parts by weight of an aqueous emulsion of poly(methyl methacrylate) polymer are thoroughly mixed; then the mixture is heated to 80° C. to 100° C. while agitating until the mixture begins to expand. It expands 3 to 10 times its original volume, thereby producing a semi-rigid, tough, cellular product, epoxy-poly(methyl methacrylate).

Other polymerized acrylate compounds may be used in place of poly(methyl methacrylate) such as poly(methyl acrylate), poly(ethyl acrylate), poly(propyl acrylate), poly(butyl acrylate), poly(pentadecyl acrylate), poly(hexadecyl acrylate), poly(benzyl acrylate) poly(cyclohexyl acrylate), poly(phenyl ethyl acrylate), poly(ethyl methacrylate), poly(methyl α-chloroacrylate, poly(2-chloroethyl acrylate), poly(1,1-dihydrofluorobutyl acrylate), poly(cyclohexyl-cyclohexyl methacrylate), poly(allyl methacrylate), copolymerized acrylate compounds, copolymers of acrylate compounds with other vinyl monomers and/or organic dienes and/or allyl halides and mixtures thereof.

EXAMPLE 32

About 3 parts by weight of diethylenetriamine and 10 parts by weight of an aqueous solution of poly(methacrylic acid) polymer are mixed, then 3 parts by weight of epichlorohydrin are slowly added while agitating and keeping the temperature between 20° C. to 70° C.;

then the temperature is increased to 80° C. to 100° C. while agitating. The mixture expands 3 to 10 times its original volume, thereby producing an epoxy-polyacrylate foam.

Other polymerized acrylic acid compounds may be used in place of poly(methacrylic acid) such as poly(acrylic acid), poly(hydroacrylic acid), poly(chloroacrylic acid), poly(ethyl acrylic acid), poly(crotonic acid), poly(fluoroacrylic acid), poly(cyclohexyl methacrylic acid), poly(isobutyl methacrylic acid), poly(bromoacrylic acid), poly(benzyl acrylic acid), polymerized copolymers of acrylic acid compounds, polymerized copolymers of acrylic acid compounds and organic diene compounds and/or allyl halide compounds, and/or vinyl monomers and mixtures thereof.

EXAMPLE 33

About 2 parts by weight of triethylenetetramine and 3 parts by weight of liquid poly(allyl chloride) are mixed, then 2 parts by weight of epichlorohydrin and 1 part by weight of 1:2, 3:4-diepoxybutane are slowly added while agitating at a temperature between 20° C. to 70° C. for 0.5 to 12 hours, thereby producing an epoxy-poly(allyl chloride) prepolymer. About 0.1 part by weight of polydimethylsiloxane-ethylene oxide copolymer is added to said epoxy-poly(allyl chloride) prepolymer, then the mixture is heated to 80° C. to 100° C. while agitating until the mixture begins to expand. It expands 3 to 10 times its original volume, thereby producing a semi-rigid, tough epoxy-poly(allyl halide) cellular product.

Other allyl halide compounds may be used in place of allyl halide such as allyl bromide, methallyl chloride, methallyl bromide and mixtures thereof.

EXAMPLE 34

About 1 to 3 parts by weight of a polyamine, 0.5 to 5 parts by weight of a polymerable organic compound, selected from the list below, are mixed, then 4 parts by weight of epichlorohydrin are slowly added while agitating at ambient pressure and at 20° C. to 70° C. for 0.5 to 12 hours, thereby producing an epoxy prepolymer. About 0.5 part by weight of aluminum hydroxide powder is added and thoroughly mixed with the epoxy prepolymer. The mixture is poured into a mold, then heated to 80° C. to 100° C. while agitating until the mixture begins to expand, thereby producing an epoxy cellular solid product.

| Example | Parts | Organic compound | Parts | Polyamine |
| --- | --- | --- | --- | --- |
| a | 3 | vinyl acetate | 3 | diethylenetriamine |
| b | 1 | styrene | 2 | ethylenediamine |
| c | 3 | methacrylic acid | 3 | propylenediamine |
| d | 2 | methyl methacrylate | 3 | triethylenetriamine |
| e | 2 | acrylic acid | 3 | diethylenetriamine |
| f | 2 | acrylonitrile | 3 | tetraethylenepentamine |
| g | 2 | vinyl chloride | 3 | diethylenetriamine |
| h | 3 | vinylidene chloride | 3 | hexamethylenediamine |
| i | 1 | vinyl purrolidone | 3 | di(hexamethylene) triamine |
| j | 1 | n-vinyl carbazole | 2 | ethylenediamine |
| k | 1 | acrylic acid | 3 | di(pentamethylene) triamine |
| | 1 | styrene | | |
| l | 1 | hydroacrylic acid | 3 | penta(hexamethylene) hexamine |
| | 1 | acrylonitrile | | |
| m | 1 | ethyl acrylate | 3 | pentamethylenediamine |
| n | 1 | allyl methacrylate | 3 | polyamide produced by 2 mols of diethylenetriamine |
| o | 1 | ethyl methacrylate | 3 | a polyamine produced by 2 mols of alpha-dichlorohydrin and 3 mols of dipropylenetriamine |
| | 1 | vinylidene chloride | | |
| p | 0.5 | methacrylate | 3 | fatty acid polyamide with free amine groups |
| | 1 | vinyl acetate | | |
| q | 1 | vinyl acetate | 3 | 2,4-tolylene diamine |

EXAMPLE 35

About 3 parts by weight of diethylenetriamine, 2 parts by weight of isoprene and 1 part by weight of vinyl acetate are mixed, then 5 parts by weight of epichlorohydrin are slowly added to the mixture while agitating and keeping the temperature between 20° C. and 70° C. for 0.5 to 12 hours, thereby producing an epoxy prepolymer. The epoxy prepolymer is poured into a mold, then heated to 80° C. to 100° C., and the prepolymer expands 3 to 10 times its original volume, thereby producing a tough cellular solid product.

EXAMPLE 36

About 3 parts by weight of a technical grade of a poly(hexamethylene) polyamine containing about 50% by weight of bis(hexamethylene) triamine, about 35% of higher-molecular-weight polyamines, and about 10% of a mixture of hexamethylenediamine, adiponitrile, ε-aminocapronitrile and 2-cyanocyclopentylidenimine are mixed with 2 parts by weight of water, then placed in a closed system equipped with a fast stirrer; then 1 part by weight of ethylene oxide is slowly added at 0 to 15 cm. of mercury above atmospheric pressure. The temperature is kept between 20° C. to 70° C. while agitating for 0.5 to 12 hours. Then 3 parts by weight of epichlorohydrin is slowly added to the mixture while agitating and keeping the temperature between 20° C. to 70° C. for 0.5 to 24 hours, thereby producing an epoxy prepolymer.

The epoxy prepolymer is then poured into a mold and heated to 80° C. to 100° C. The mixture expands 3 to 10 times its original volume, thereby producing a flexible, tough cellular solid product.

The alkylene oxides, ethylene oxide, propylene oxide and mixtures thereof may be added simultaneously with the epichlorohydrin while keeping the temperature between 20° C. to 70° C.

EXAMPLE 37

About 3 parts by weight of diethylenetriamine and 2 parts by weight of water are mixed, then 2 parts by weight of propylene oxide are slowly added while agitating. About 4 parts by weight of epichlorohydrin are slowly added to the mixture while agitating and keeping the temperature between 20° C. to 70° C. at ambient pressure for 0.5 to 24 hours, thereby producing an epoxy prepolymer.

About 1 part by weight of aluminum hydroxide powder is mixed with the epoxy prepolymer, then heated to 80° C. to 100° C. and the mixture expands 3 to 10 times its original volume, thereby producing a flexible cellular solid product.

EXAMPLE 38

Example 37 is changed, wherein the propylene oxide and epichlorohydrin are added simultaneously while agitating and keeping the temperature between 20° C. and 70° C.

EXAMPLE 39

About 1 part by weight of epichlorohydrin is slowly added to about 1 part by weight of 2,4-tolylenediamine while agitating at 20° C. to 70° C. and at ambient pressure for 0.5 to 12 hours, thereby producing an epoxy prepolymer. About 0.25 part by weight of ethyl cellulose is mixed with the epoxy prepolymer, then the mixture is heated to 80° C. to 100° C. The mixture expands 3 to 10 times its original volume, thereby producing an epoxy cellular solid product.

Although specific conditions and ingredients have been described in conjunction with the above examples of preferred embodiments, these may be varied and other reagents and additives may be used, where suitable, as described above, with similar results.

Other modifications and applications of this invention will occur to those skilled in the art upon reading this disclosure. These are intended to be included within the scope of this invention as defined in the appended claims.

I claim:

1. The process for the production of epoxy cellular solid reaction products in a non-aqueous medium without the addition of a blowing agent, by the following steps:
   (a) adding about 1 to 3 parts by weight of an organic polyamine compound;
   (b) adding slowly 1 to 5 parts by weight of an epoxy compound to the polyamine compound while
   (c) agitating the mixture and keeping the temperature between 20° C. to 70° C. until the resulting chemical reaction is completed, thereby
   (d) producing an epoxy prepolymer;
   (e) admixing 0 to 2 parts by weight of a foam regulator to the epoxy prepolymer;
   (f) heating the epoxy prepolymer to a temperature of 80° C. to 100° C. until the mixture expands, thereby
   (g) producing an epoxy cellular solid reaction product.

2. The process of claim 1 wherein the epoxy compound is epichlorohydrin.

3. The process of claim 1 wherein the polyamine compound is selected from the group consisting of alkylenepolyamine, polyalkylenepolyamine, arylenepolyamine, polyamide polymers containing 2 or more free amine groups per molecule and mixtures thereof.

4. The process of claim 1 wherein the foam regulator is selected from the group consisting of metallic powder, metallic oxide powder, metallic hydroxide powder, manganese chloride, polyether siloxanes, ethyl cellulose and mixtures thereof.

5. The process of claim 1 wherein an additional step is taken wherein 1 to 8 parts by weight of an epoxy resin containing 2 or more reactive epoxy groups per molecule are added in step (e) of claim 1.

6. The process of claim 1 wherein an additional step is taken wherein 1 to 5 parts by weight of an epoxy compound, containing at least 1 epoxy group, are added in step (e) of claim 1.

7. The process of claim 1 wherein an additional step is taken wherein an alkali metal compound, selected from the group consisting of sodium hydroxide, potassium hydroxide, sodium carbonate and potassium carbonate, is added to step (a) of claim 1, in the proportion of 1 to 2 mols to each 2 mols of the halide present in the epoxy compound.

8. The process of claim 1 wherein an additional step is taken wherein an alkali metal polysulfide is added in step (a) of claim 1 in the proportion of 1 mol to 2 to 4 mols of the halide present in the epoxy compound.

9. The process of claim 1 wherein an additional step is taken wherein 1 to 2 parts by weight of a lignin compound, selected from the group consisting of sulfite lignin, sulfate lignin produced by the soda process (Kraft process), sodium salt of sulfite lignin, calcium sulfite lignin, partially desulfonated sulfite lignin and mixtures thereof, are added in step (a) of claim 1.

10. The process of claim 1 wherein an additional step is taken wherein 1 to 2 parts by weight of an organic polyhydroxy compound are added in step (a) of claim 1.

11. The process of claim 1 wherein an additional step is taken wherein 1 to 2 parts by weight of a vegetable oil are added in step (a) of claim 1.

* * * * *